No. 727,118. Patented May 5, 1903.

UNITED STATES PATENT OFFICE.

THOMAS A. EDISON, OF LLEWELLYN PARK, NEW JERSEY, ASSIGNOR TO EDISON STORAGE BATTERY COMPANY, OF ORANGE, NEW JERSEY, A CORPORATION OF NEW JERSEY.

PROCESS OF MANUFACTURING ELECTROLYTICALLY-ACTIVE FINELY-DIVIDED IRON.

SPECIFICATION forming part of Letters Patent No. 727,118, dated May 5, 1903.

Application filed October 21, 1902. Serial No. 128,186. (No specimens.)

*To all whom it may concern:*

Be it known that I, THOMAS A. EDISON, a citizen of the United States, residing at Llewellyn Park, Orange, in the county of Essex and State of New Jersey, have invented a certain new and useful Improved Process of Manufacturing Electrolytically-Active Finely-Divided Iron, of which the following is a specification.

My invention relates to an improved process of manufacturing electrolytically-active finely-divided iron for use in reversible galvanic batteries employing alkaline electrolytes, and particularly when opposed to a depolarizer utilizing an electrolytically-active compound of nickel, as I have described in patents already granted to me.

My object is to provide a process by which finely-divided iron can be produced which shall be electrolytically active to a large extent and which process can be performed on an extensive scale for the production of the finely-divided iron at low cost.

In carrying the invention into effect I proceed substantially as follows: A suitable retort is charged with finely-divided oxid of iron—for instance, ferric oxid, ($Fe_2O_3$)—and is subjected to the reducing action of hydrogen gas at a temperature of about 900° Fahrenheit. The heating of the material is performed by heating the retort and also by heating the hydrogen gas before its introduction into the retort. The reduction is continued until the finely-divided iron is electrolytically active, the time required depending upon the special conditions of the charge and of the apparatus. Ordinarily, however, with the ordinary ferric oxid of commerce a reduction with hydrogen gas at a temperature of 900° Fahrenheit will be sufficient for the purpose if maintained continuously for a period of twenty hours, more or less, according to the quantity of hydrogen used. After the reduction has continued to the desired extent the mass is permitted to cool to the normal temperature while still surrounded by the gas, thus excluding atmospheric air and preventing spontaneous oxidation. Water is now admitted into the retort, so as to at least cover the mass and preferably, also, to practically or wholly fill the retort, so as to expel the hydrogen gas therefrom. The introduction of water into the retort, as explained, prevents oxidation of the iron to its original condition of oxidation and permits the retort to be opened to allow the contents thereof to be removed. The reduced iron in its wet or moist condition can now be mixed with flake-graphite or other inert conducting material and molded into briquets for use in the complete cell without any serious oxidation taking place, even when exposed to the air. If desired, the iron so produced may be mixed with a smaller proportion of some easily-reducible material, like copper oxid, as I describe in my application for patent filed October 3, 1902.

What I claim is—

1. A process for making electrolytically-active finely-divided iron, which consists in reducing an iron compound by hydrogen in the presence of heat, and in then flooding the reduced mass with water to prevent atmospheric oxidation, substantially as set forth.

2. A process for making electrolytically-active finely-divided iron, which consists in reducing a compound of iron by hydrogen in the presence of heat, then in cooling the reduced mass, and finally in flooding the reduced mass with water to prevent atmospheric oxidation, substantially as set forth.

3. A process for making electrolytically-active finely-divided iron, which consists in charging a retort with a compound of iron, in reducing the iron compound by hydrogen gas in the presence of heat, and in finally flooding the retort with water to prevent atmospheric oxidation of the mass when removed, substantially as set forth.

4. A process for making electrolytically-active finely-divided iron, which consists in charging a retort with a compound of iron, in reducing the iron compound by hydrogen in the presence of heat, in allowing the reduced mass to cool, and in finally flooding the retort with water to prevent atmospheric oxidation of the mass when removed, substantially as set forth.

5. The process of making electrolytically-active finely-divided iron, which consists in reducing an iron compound by hydrogen in the presence of heat until an electrolytically-active oxid is obtained, and in finally flooding the oxid so obtained with water, with the exclusion of oxidizing influences, substantially as set forth.

6. The process of making electrolytically-active finely-divided iron, which consists in reducing an iron compound by hydrogen in the presence of heat until an electrolytically-active oxid is obtained, in cooling the oxid while still subjected to hydrogen, with the exclusion of oxidizing influences, and in flooding the oxid with water, substantially as set forth.

7. The process of making electrolytically-active finely-divided iron, which consists in reducing ferric oxid by hydrogen in the presence of heat until an electrolytically-active oxid is obtained, and in finally flooding the oxid so obtained with water, with the exclusion of oxidizing influences, substantially as set forth.

8. The process of making electrolytically-active finely-divided iron, which consists in reducing ferric oxid by hydrogen in the presence of heat until an electrolytically-active oxid is obtained, in cooling the oxid while still subjected to hydrogen, with the exclusion of oxidizing influences, and in flooding the oxid with water, substantially as set forth.

This specification signed and witnessed this 13th day of October, 1902.

THOS. A. EDISON.

Witnesses:
J. F. RANDOLPH,
J. A. BOEHME.